United States Patent [19]
Lin et al.

[11] Patent Number: 5,235,350
[45] Date of Patent: Aug. 10, 1993

[54] PIGMENTED SEMICONDUCTIVE HOT MELT INK AND INK JET APPARATUS EMPLOYING SAME

[75] Inventors: An C. R. Lin, Cupertino; Juan E. Lopez, Newbury Park, both of Calif.

[73] Assignee: Dataproducts Corporation, Woodland Hills, Calif.

[21] Appl. No.: 759,638

[22] Filed: Sep. 12, 1991

Related U.S. Application Data

[63] Continuation of Ser. No. 468,363, Jan. 22, 1990, abandoned.

[51] Int. Cl.⁵ ............................................. G01D 15/16
[52] U.S. Cl. .................................................. 346/140 R
[58] Field of Search ................. 346/140, 1.1; 400/120, 400/126; 106/20, 22

[56] References Cited

U.S. PATENT DOCUMENTS

| | | | |
|---|---|---|---|
| 3,715,219 | 2/1973 | Kurz et al. | 106/22 |
| 3,879,572 | 4/1975 | Shoji et al. | 174/257 |
| 4,312,009 | 1/1982 | Lange | 346/140 |
| 4,791,439 | 12/1988 | Guiles | 346/140 |
| 5,006,170 | 4/1991 | Schuavz et al. | 106/20 |

*Primary Examiner*—Mark J. Reinhart
*Attorney, Agent, or Firm*—Woodcock Washburn Kurtz Mackiewicz & Norris

[57] ABSTRACT

Ink jet apparatus including a print head having at least one chamber, an inlet opening to the chamber, and a droplet ejection orifice from the chamber, a transducer coupled to the chamber for ejecting droplets of ink in liquid form therefrom through the orifice, a manifold for supplying ink in its liquid form to the at least one chamber, and a cartridge, coupled to the manifold, for containing a supply of ink in solid form. The ink includes a wax-based vehicle to provide it with a hot melt capability, and a conductive pigment substantially dispersed throughout the wax-based vehicle to adapt it for self-melting. Accordingly, the cartridge includes a source of electrical current for energizing the conductive pigment on demand, wherein such supply of ink in solid form can be melted to a jettable liquid form upon energization of the conductive pigment by the source.

27 Claims, 3 Drawing Sheets

PIGMENTED SEMICONDUCTIVE HOT MELT INK AND INK JET APPARATUS EMPLOYING SAME

This is a continuation of application Ser. No. 468,363, filed Jan. 22, 1990 now abandoned.

BACKGROUND OF THE INVENTION

1. Field of the Invention

The present invention relates generally to hot melt inks, and more particularly to pigmented semiconductive hot melt inks and ink jet apparatus employing same.

2. Statement of the Prior Art

"Hot melt" inks (i.e., inks which are typically in a solid form at room temperature, but which are in a liquid form at a temperature that is above room temperature), and ink jet apparatus employing hot melt inks are well known. For example, Merritt et al. in U.S. Pat. No. 4,390,369 and U.S. Pat. No. 4,484,948 disclose various types of natural wax-containing, hot melt inks which are suitably employed in ink jet apparatus of the type disclosed by Howkins in U.S. Pat. No. 4,459,601. Each of the above noted patents is assigned to the assignee of the present invention and is incorporated herein by reference.

Pigmented inks are also well known. For example, it is known to employ carbon black as black pigment in inks. See, e.g., U.S. Pat. No. 3,660,133—Van Der Schuyt et al. Inks which contain pigments for their coloration are often preferred over dye-colored inks because they shrink less. However, pigmented inks are also often troublesome because of the requirement for constant pigment dispersion in order to maintain overall ink quality.

Carbon blacks (e.g., channel black, soft black, and furnace black, etc.) are crystallographically related to graphite and, as such, can be intrinsic semiconductors. Such carbon blacks, for example, have been used extensively in the plastics industry to render normally resistive polymers electrically conductive. Carbon blacks have also been used together with resin binders to produce "electrical resistor inks", which are inks that are used as direct substitutes for discrete resistors in all types of electrical circuits. See, e.g., U.S. Pat. No. 3,992,212—Youtsey et al. and U.S. Pat. No. 4,479,890—Prabhu et al. Those known electrical resistor inks, however, are of a liquid form. Such inks containing carbon black have been used in a variety of ink jet printing apparatus. For example, Nguyen et al. in U.S. Pat. No. 4,530,961 disclose low viscosity stable aqueous dispersions of graft carbon black in liquid inks suitable for use in "jet-printing" (i.e., continuous) machines.

Sachdev et al. in U.S. Pat. No. 4,549,824 also disclose the use of carbon black-containing inks in thermal ink transfer printing processes, and Fujimura et al. in U.S. Pat. No. 4,737,803 disclose the use of such inks in a thermal electrostatic ink-jet recording apparatus.

The advantages of hot melt inks and ink jet apparatus employing same when compared to liquid inks are legion and notoriously well known. However, ink jet apparatus which typically employs hot melt ink requires additional systems to melt the hot melt ink from its solid form to its liquid form, to maintain such liquid form in a stable state, and to supply that hot melt ink in such a stable, liquid form at the print head for ejection therefrom. Conventional hot melt ink jet printing apparatus utilize thermistors or other similar such heating means to accomplish these ends. For example, see U.S. Pat. No. 4,607,266—DeBonte and U.S. Pat. No. 4,791,439—Guiles, each of which is assigned to the assignee of the present invention and is incorporated herein by reference.

The two patents referred to immediately herein above do not disclose the use of hot melt inks containing carbon black. However, Berry et al. in U.S. Pat. No. 3,653,932 and Kurz et al. in U.S. Pat. No. 3,715,219 both disclose electrostatically-deflected ink jet apparatus which use hot melt inks containing carbon black for the purposes of achieving resistivities in the range of $10^6$ to $10^{11}$ ohm-centimeters. It is known that such resistivities are needed to achieve proper deflection of ink streams in electrostatic ink jet apparatus. Moreover, the specific apparatus that is disclosed in these patents includes heating means to maintain their inks in a liquid phase to the end that continuous flow thereof may be maintained to the nozzle.

SUMMARY OF THE INVENTION

Accordingly, it is a general object of the present invention to provide pigmented semiconductive hot melt inks and ink jet apparatus employing same. More specifically, it is an object of the present invention to provide such pigmented semiconductive hot melt inks as well as the ink jet apparatus employing same which capitalizes upon the semiconductive nature of such inks to melt them from their solid form at room temperature to a jettable liquid form at an elevated temperature.

Another object of the present invention is to provide ink jet apparatus capable of maintaining the pigments used in such pigmented semiconductive hot melt inks in a fully dispersed state, thereby assuring the quality of colors in those inks.

Still another object of the present invention is to provide ink jet apparatus for such pigmented semiconductive hot melt inks that is capable of controlling solidification and melting of those inks.

Briefly, these and other objects according to the present invention are accomplished by ink jet apparatus including a print head having at least one chamber, an inlet opening to the chamber, and a droplet ejection orifice from the chamber, transducer means coupled to the chamber for ejecting droplets of ink in liquid form therefrom through the orifice, means for supplying ink in its liquid form to the at least one chamber, and means, coupled to the supplying means, for containing a supply of ink in solid form.

The ink, according to one preferred embodiment of the present invention, comprises not only a wax-based vehicle to provide such ink with a hot melt capability, but also a conductive pigment substantially dispersed throughout the wax-based vehicle to adapt such ink for self-melting. In accordance with another important aspect of this invention, therefore, the means for containing the supply of ink in solid form includes means for energizing the conductive pigment on demand, wherein such supply of ink in solid form can be melted to a jettable liquid form upon energization of the conductive pigment by the energizing means.

Other objects, advantages and novel features according to the present invention will become more apparent from the following detailed description thereof, when considered in conjunction with the accompanying drawings wherein:

DETAILED DESCRIPTION OF THE INVENTION

Figure 1:
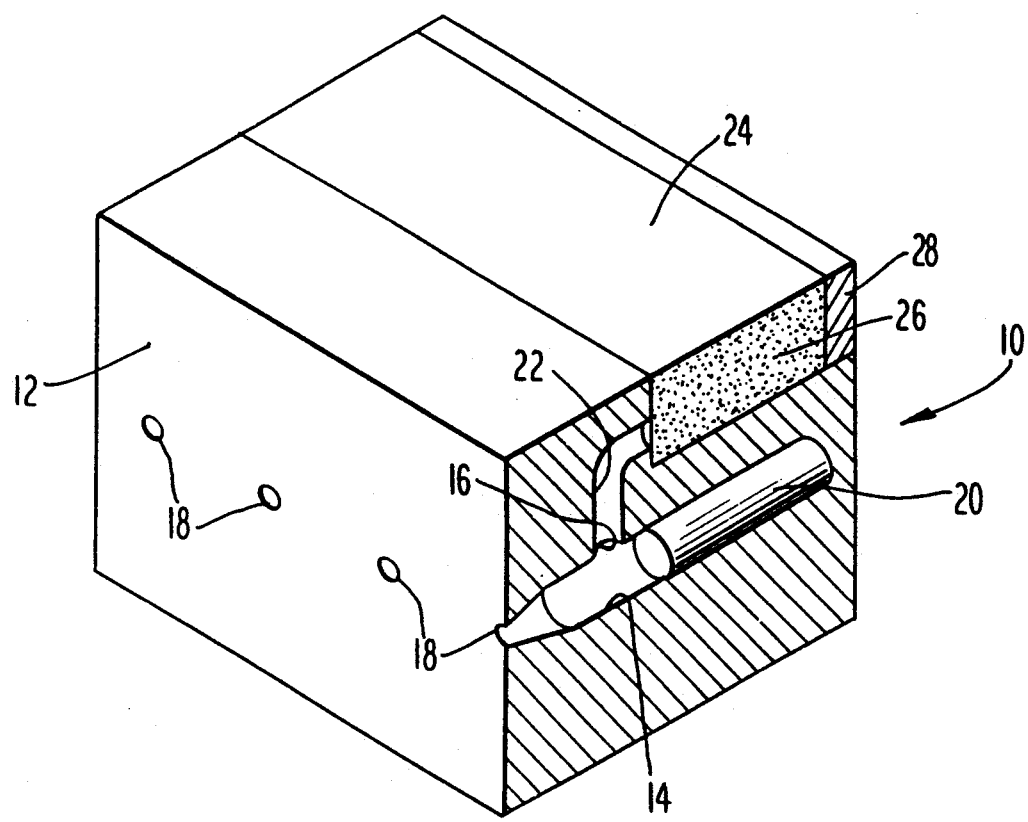
FIG. 1 illustrates ink jet printing apparatus that is suitable for use with pigmented semiconductive hot melt ink in accordance with the present invention.

A pigmented semiconductive hot melt ink composition suitable for use in an ink jet apparatus according to the present invention generally comprises a wax-based vehicle and a conductive pigment that is substantially dispersed throughout the wax-based vehicle. The wax-based vehicle comprises a major portion of the ink composition (i.e., from about 80 to 95 percent by weight of the ink composition), while the conductive pigment comprises a minor portion of the ink composition (i.e., from about 5 to 20 percent by weight of the ink composition).

Wax-containing ink jet inks, such as the pigmented semiconductive hot melt ink described above, are usually solid or semi-solid at ambient or room temperature, and must, therefore, be discharged from the ink jet apparatus at elevated temperatures. Such heated ink in its liquid form will quickly solidify after coming in contact with a substrate, typically in the form of paper. Since a wax-containing ink's rate of solidification will control the degree of ink penetration into the paper, usually a small circular dot will result. As a general rule, furthermore, inks containing wax as a major component thereof will have less penetration into the paper than inks containing only additive amounts of wax. A definition of "waxes" can be found in the above-referenced U.S. Pat. No. 4,390,369—Merritt et al.

In accordance with one important aspect of the invention, a suitable wax-based vehicle may be selected from the group consisting of candelilla wax, carnauba wax, stearic acid, behenic acid, ceresin wax, and other similar waxes such as microcrystalline waxes. For a black colored ink, the conductive pigment suitably comprises carbon black such as VULCAN® XC-72 or BLACK PEARLS® 2000 manufactured by Cabot Corporation of Boston, Mass. Carbon blacks having a relatively high surface area, high structure, and low volatile content are also suitable since they typically are the most electrically conductive carbon blacks.

Specific formulations of ink compositions according to the present invention are presented in Table I below:

TABLE I

|  | 1 | 2 | 3 |
|---|---|---|---|
|  | (Percent by Weight) | | |
| Stearic acid | — | 87 | 92 |
| Candelilla wax | 85 | — | — |

TABLE I-continued

|  | 1 | 2 | 3 |
|---|---|---|---|
|  | (Percent by Weight) | | |
| BLACK PEARLS® 2000 | 15 | 13 | 8 |

The ink composition according to Formulation 2 has a volume resistivity of approximately 3,000 ohms-centimeters, while the ink composition according to Formulation 3 has a volume resistivity of approximately 30,000 ohms-centimeters. It has since been found, however, that ink compositions having volume resistivities in the range of from about 100 ohms-centimeters to about 10,000 ohms-centimeters comprise more suitable pigmented semiconductive hot melt inks because of their resulting conductivities which minimize requirements of power to melt such inks. For example, a sample amount of Formulation 2, sufficient for use in conventional ink jet printing apparatus, required a sustained electrical current of 0.2 amperes at 30 volts to begin melting of the ink. Such power is readily achievable by, and suitably incorporated within most known ink jet printing apparatus.

Other colored inks are likewise available for use as pigmented semiconductive hot melt inks in accordance with the present invention, as long as they are conductive and result in ink compositions having volume resistivities within the range noted above. For example, various pigments that are manufactured by Ciba Geigy PLC of Manchester, England may be suitably employed to formulate ink compositions of other colors in accordance with the present invention. One Ciba Geigy PLC pigment that has been found suitable for the color red is Cromophtal, Grade BR, while the colors yellow may be accomplished either with Ciba Geigy's Irgazin 2ZLT or its Microlith 2R-K, and blue either with its Cromophtal Blue A3R or its Microlith Blue 46K. The color violet may be accomplished in accordance with the present invention by using Ciba Geigy's Microlith Violet B-K.

A suitable conductive material is preferably mixed with the above-described pigments where such pigments are not themselves semiconducting. It has been found that such pigments can be mixed with carbon fibers, copper powders (e.g., cuprous iodide), silver powders or other magnetic powders in such amounts as are effective to produce volume resistivities of the ink in the range of from about 100 ohms-centimeters to about 10,000 ohms-centimeters.

Referring now to the drawings, wherein like numbers designate like or corresponding parts throughout each of the several views, there is shown in FIG. 1 one ink jet printing apparatus 10 that is suitable for use with the pigmented semiconductive hot melt ink in accordance with the present invention.

The apparatus 10 generally comprises a print head 12 including at least one chamber 14, an inlet 16 opening to the chamber 14, and a droplet ejection orifice 18 from the chamber 14, transducer means 20 coupled to the chamber 14 for ejecting droplets of ink (not shown) in liquid form therefrom through the orifice 18, means 22 for supplying ink in the liquid form to the at least one chamber 14, and cartridge means 24, coupled to the supplying means 22, for containing a supply of ink 26 in solid form, the supply of ink 26 comprising one of the formulations described herein above.

Examples of suitable such ink jet printing apparatus are disclosed in Cooke et al.—U.S. Pat. No. 4,631,557 and in DeYoung—U.S. Pat. No. 4,667,206, both of which are assigned to the assignee of the present invention and are incorporated herein by reference.

Figure 2:
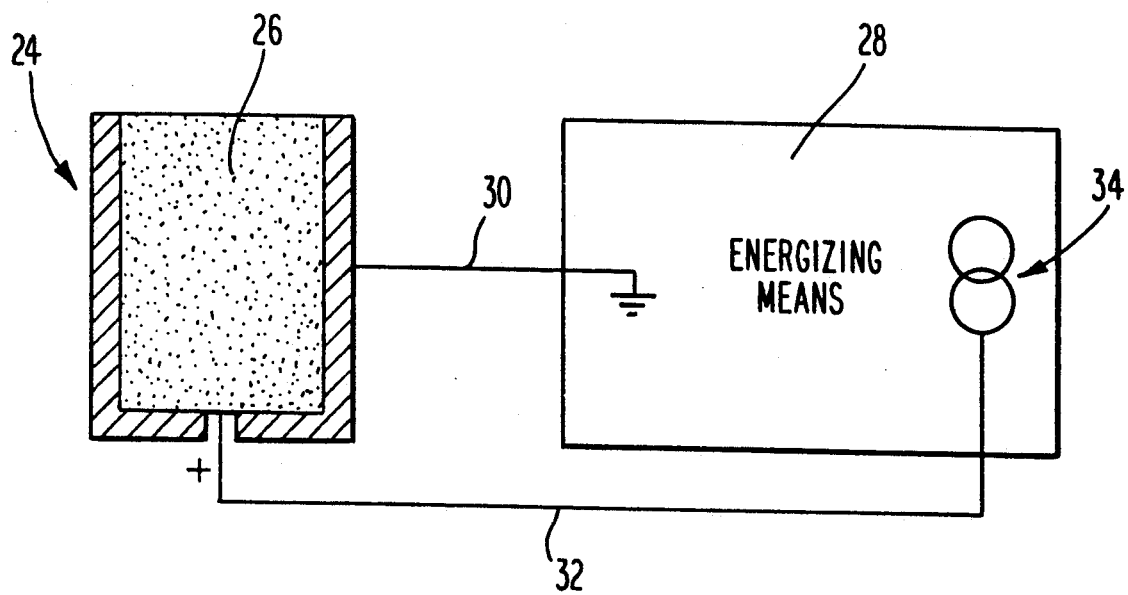
FIG. 2 shows in section one embodiment of means for containing a supply of pigmented semiconductive hot melt ink according to the present invention.

In accordance with another important aspect of the present invention, the cartridge means 24 herein includes means 28 for energizing the conductive pigment contained within the supply of ink 26 on demand, wherein the supply of ink 26 is melted to a liquid form upon energization of the conductive pigment by the energizing means 28. As is shown in FIG. 2, the cartridge means 24 suitably comprises a conductive cup (e.g., an aluminum cup such as that which is disclosed in U.S. Pat. No. 4,823,146, assigned to the assignee of the present invention and incorporated herein by reference). In such a manner, the cartridge means 24 is electrically connected to the energizing means 28 via a first electrode 30 which grounds the conductive cup and a second, positive electrode 32 that is coupled to a source 34 of electrical current.

Because the substantially dispersed conductive pigment which is contained within the supply of ink 26 will conduct therethrough current from the source 34, the supply of ink 26 will melt and will flow through the supplying means 22 to the inlet 16 of the chamber 14, where it can be ejected through the orifice 18 by the transducer means 20.

Figure 3:
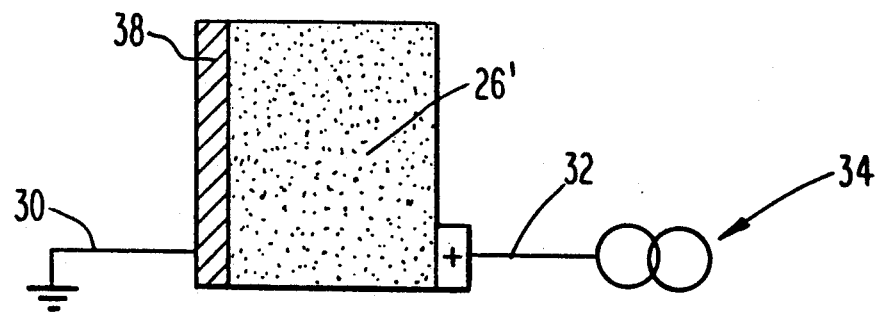
FIG. 3 illustrates schematically another embodiment of means for containing a supply of pigmented semiconductive hot melt ink according to the present invention.

Referring now to FIG. 3, another embodiment of means for containing a supply of the pigmented semiconductive hot melt ink according to the present invention is disclosed. In a similar manner as is referred to immediately herein above, a supply 26' of ink is formed into a bar or other suitable geometry, and is placed contiguously adjacent a conductive plate 38 which is grounded by the first electrode 30. For example, the conductive plate 38 may suitably comprise the chamber plate of the above-referenced ink jet printing apparatus. The second, positive electrode 32 is likewise connected to the source 34 of electrical current such that the supply 26' of ink can be melted on demand.

Figure 4:
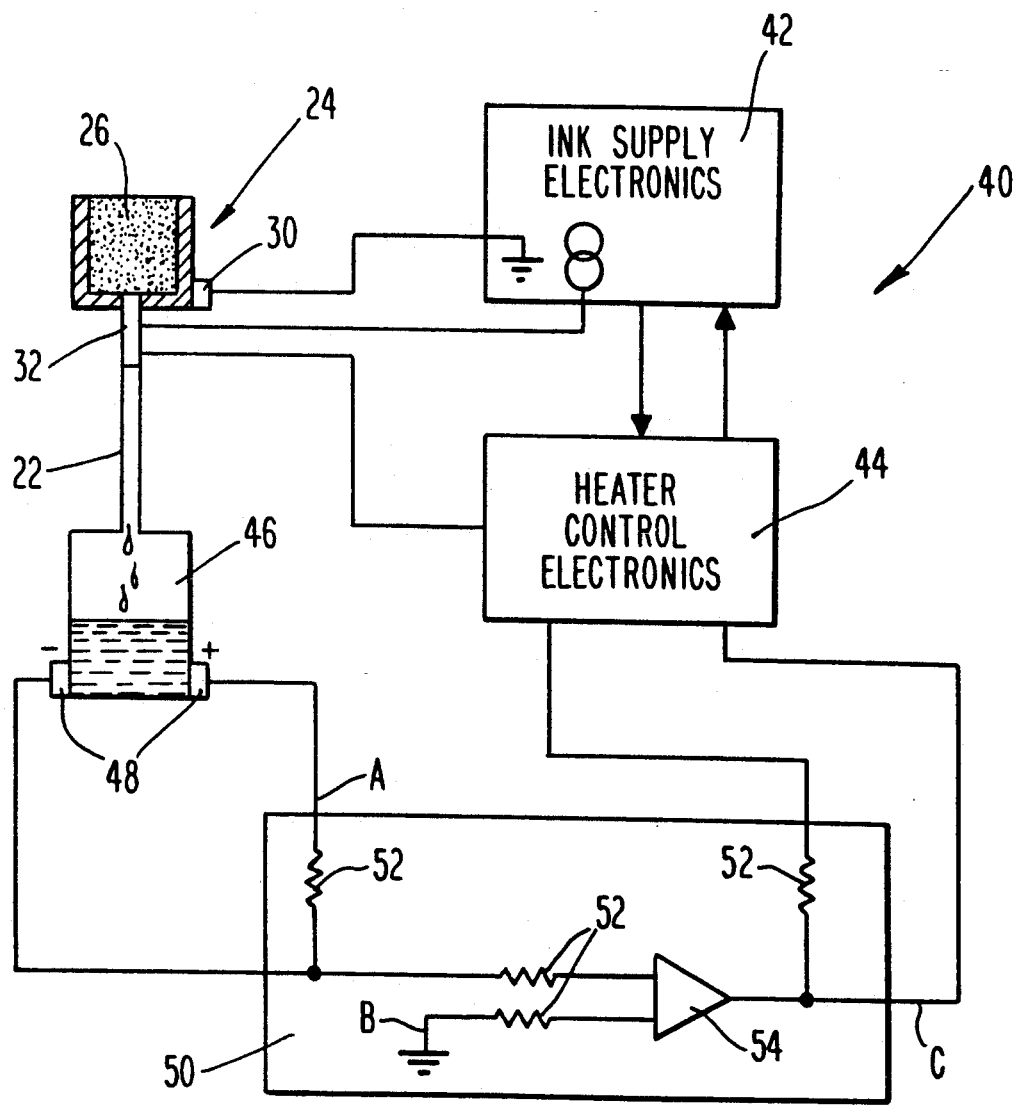
FIG. 4 shows in detail level control means suitable for use with pigmented semiconductive hot melt ink according to the present invention.

With reference now to FIG. 4, there is shown in detail level control means 40 suitable for use with the pigmented semiconductive hot melt ink and ink jet apparatus according to the present invention. The level control means 40 generally comprises the pigmented semiconductive hot melt ink contained within the cartridge means 24, electrodes 30 and 32, source 34 of electrical current in the form of ink supply electronics 42 and heater control electronics 44, a reservoir 46 within the supplying means 22, another pair of electrodes 48 connected to the reservoir 46, and level detect electronics 50 including a plurality of resistors 52 and an amplifier 54.

Since the melted supply of ink within the reservoir 46 will retain its conductivity by virtue of the substantially dispersed conductive pigment, the pair of electrodes 48 that are connected to the level detect electronics 50 will provide a signal A indicative of the resistance of the ink within the reservoir 46. Thereafter, signal A serves as a first input to the amplifier 54 which also has a signal B input thereto as a comparative trigger level. An output signal C from the amplifier 54 yields an indication of the level of melted ink within the reservoir 46, and is thereafter used to generate control signals D between heater control electronics 44 and ink supply electronics 42 to cause a current to flow through the supply 26 of ink in solid form.

Figure 5:
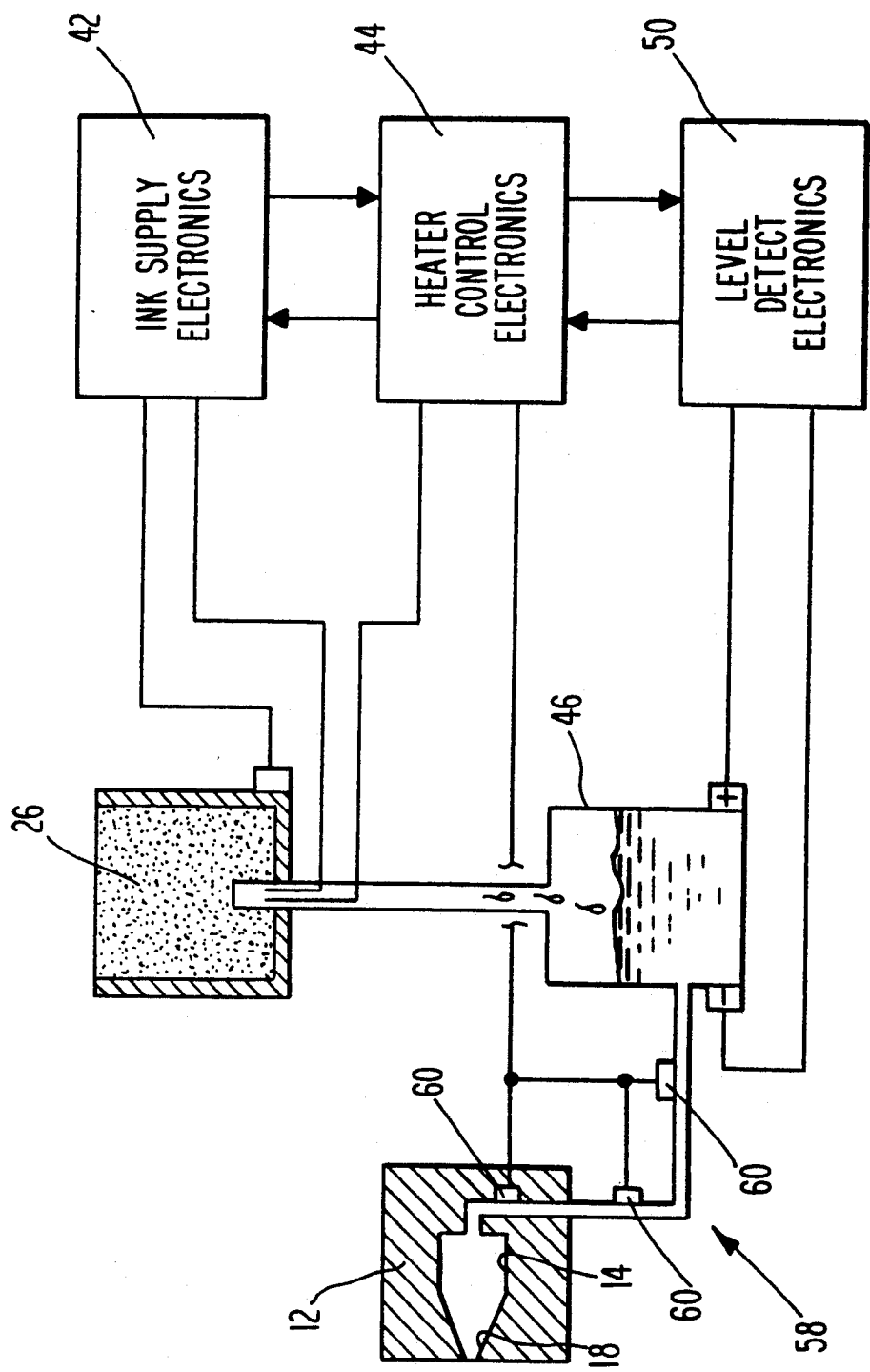
FIG. 5 illustrates solidification and melting control means suitable for use with pigmented semiconductive hot melt ink and ink jet printing apparatus in accordance with the present invention.

Referring now to FIG. 5, there is shown solidification and melting control means 58 that is suitable for use with the pigmented semiconductive hot melt ink and ink jet apparatus in accordance with the present invention. Like the heater control electronics 44 shown in FIG. 4, the solidification and melting control means 58 includes a plurality of electrodes 60 along the path of ink within the supplying means 46 from the reservoir 46 to each chamber 14 (FIG. 1). Each of the electrodes 60 can be sequentially energized by the heater control electronics 44 to heat up in a direction from the reservoir 46 to the chamber 14, and to cool down from the chamber 14 to the reservoir 46. In such a manner, entrapment of air within the ink can be minimized.

Obviously, many modifications and variations are possible in light of the teachings herein above. The ink may be suitably formed of any hot melt vehicle (i.e., one or more vehicles other than a wax-based vehicle), for example, if the resulting vehicle-conductive pigment combination has a volume resistivity in the range disclosed herein. It is, therefore, to be understood that within the scope of the appended claims, this invention may be practiced otherwise than as is specifically described herein.

What we claim is:

1. Ink jet apparatus, comprising:
   a print head including at least one chamber, an inlet opening to said chamber, and a droplet ejection orifice from said chamber;
   transducer means coupled to said chamber for ejecting droplets of ink in liquid form therefrom through said orifice;
   means for supplying ink in said liquid form to said at least one chamber;
   a supply of ink in solid form coupled to said means for supplying ink in said liquid form, said supply of ink in said solid form including a hot melt vehicle and a conductive pigment which is substantially dispersed throughout said hot melt vehicle; and
   means coupled with said supply of ink in solid form for energizing said conductive pigment on demand;
   wherein said supply of ink in said solid form is melted to said liquid form upon energization of said conductive pigment by said energizing means an is supplied in said liquid form to said at least one chamber.

2. The ink jet apparatus according to claim 1, further comprising:
   a cartridge for containing said supply of ink in said solid form, said cartridge comprising an electrically conductive material; and
   a pair of electrodes coupled to said cartridge and said energizing means for providing a current source to melt said supply of ink in said solid form.

3. The ink jet apparatus according to claim 1, wherein said conductive pigment comprises a pigment having a volume resistivity within a range of from about 100 to about 10,000 ohms-centimeters.

4. The ink jet apparatus according to claim 1, wherein said hot melt vehicle comprises a wax-based vehicle.

5. The ink jet apparatus according to claim 4, wherein said wax-based vehicle is selected from the group consisting of candelilla wax, carnauba wax, stearic acid, behenic acid, ceresin wax, and microcrystalline wax.

6. The ink jet apparatus according to claim 1, wherein said supply of ink in said solid form has a melting point and a specific heat capacity adapted to melt said supply of ink in said solid form to said liquid form by heat generated within said supply of ink in said solid form through said energizing means.

7. The ink jet apparatus according to claim 1, wherein said conductive pigment comprises a pigment having a selected resistivity.

8. The ink jet apparatus according to claim 7, wherein said selected resistivity comprises a volume resistivity within a range of from 100 to 10,000 ohms-centimeters.

9. The ink jet apparatus according to claim 1, wherein said supplying means comprises:
  reservoir means for holding a supply of ink in said liquid form, said reservoir means receiving said supply of ink in said liquid form from said cartridge means; and
  manifold means, coupling said reservoir means to said at least one chamber, for providing said supply of ink in said liquid form to said at least one chamber.

10. The ink jet apparatus according to claim 9, further comprising means for controlling a level of said supply of ink in said liquid form contained within said reservoir means, wherein said energizing means is activated by said controlling means in response to said level.

11. In a hot melt ink jet apparatus having:
  a source of electrical current coupled with a supply of ink in solid form;
  a print head which includes at least one chamber, an inlet opening to the chamber, and a droplet ejection orifice from the chamber; and
  means for supplying ink in liquid form to the chamber;
an ink comprising:
  a hot melt vehicle; and
  a conductive pigment substantially dispersed throughout said hot melt vehicle, said conductive pigment having a predetermined resistivity that is adapted to conduct electrical current from the source, coupled with said supply of ink in solid form, thereby melting the ink.

12. The ink composition according to claim 11, wherein said hot melt vehicle comprises a wax-based vehicle.

13. The ink composition according to claim 12, wherein said wax-based vehicle is selected from the group consisting of candelilla wax, carnauba wax, stearic acid, behenic acid, ceresin wax, and microcrystalline wax.

14. The ink composition according to claim 11, wherein said predetermined resistivity comprises a volume resistivity greater than 100 ohms-centimeters.

15. The ink composition according to claim 14, wherein said predetermined resistivity comprises a volume resistivity of approximately 3,000 ohms-centimeters.

16. The ink composition according to claim 11, wherein said predetermined resistivity comprises a volume resistivity within the range of from about 100 ohms-centimeters to about 10,000 ohms-centimeters.

17. Ink jet apparatus, comprising:
  a print head having at least one chamber, an inlet opening to said chamber, and a droplet ejection orifice from said chamber;
  transducer means coupled to said chamber for ejecting droplets of ink in liquid form therefrom through said orifice;
  means for supplying ink in said liquid form to said at least one chamber;
  a supply of ink in solid form, coupled to said means for supplying ink in said liquid form, said supply of ink in said solid form including a hot melt vehicle and a conductive pigment which is substantially dispersed throughout said hot melt vehicle; and
  means for providing electrical energy to said supply of ink in sold form;
  wherein said supply of ink in said solid form is melted to a liquid form upon provision of said electrical energy and is supplied in said liquid form to at least one chamber.

18. The ink jet apparatus according to claim 17, wherein said hot melt vehicle comprises a wax-based vehicle.

19. The ink jet apparatus according to claim 18, wherein said wax-based vehicle is selected from the group consisting of candelilla wax, carnauba wax, stearic acid, behenic acid, ceresin wax, and microcrystalline wax.

20. The ink jet apparatus according to claim 17, wherein said supply of ink in said solid form has a melting point and a specific heat capacity adapted to melt said supply of ink in said solid form to said liquid form by heat generated within said supply of ink in said solid form through said energizing means.

21. The ink jet apparatus according to claim 17, wherein said conductive pigment comprises a pigment having a selected resistivity.

22. The ink jet apparatus according to claim 21, wherein said selected resistivity comprises a volume resistivity within a range of from 100 to 10,000 ohms-centimeters.

23. The ink jet apparatus according to claim 17, further comprising cartridge means for containing said supply of ink in said solid form.

24. The ink jet apparatus according to claim 23, wherein said supplying means comprises:
  reservoir means for holding a supply of ink in said liquid form, said reservoir means receiving said supply of ink in said liquid form from said cartridge means; and
  manifold means, coupling said reservoir means to said at least one chamber, for providing said supply of ink in said liquid form to said at least one chamber.

25. The ink jet apparatus according to claim 24, further comprising means for controlling a level of said supply of ink in said liquid form contained within said reservoir means, wherein said energizing means is activated by said controlling means in response to said level.

26. The ink jet apparatus according to claim 24, further comprising means for controlling solidification and melting of said supply of ink in said liquid form.

27. The ink jet apparatus according to claim 26, wherein said solidification and melting control means comprises a plurality of electrodes attached to said supplying means between said reservoir means and said chamber, each said electrode adapted to be energized sequentially by said energizing means.

* * * * *